United States Patent [19]

Mikulka et al.

[11] Patent Number: 5,338,563
[45] Date of Patent: Aug. 16, 1994

[54] PROCESS FOR THE PREPARATION OF A SPATTER-RESISTANT LOW-FAT SPREAD

[75] Inventors: Thomas L. Mikulka, Lake Hiawatha; Nicola T. Bennardo, South Plainfield; Steven D. Wienick, Lincoln Park; Thomas M. Trainor, Sparta, all of N.J.

[73] Assignee: Nabisco, Inc., Parsippany, N.J.

[21] Appl. No.: 877,560

[22] Filed: May 1, 1992

[51] Int. Cl.$^5$ .............................................. A23D 7/00
[52] U.S. Cl. ................................... 426/604; 426/575; 426/576; 426/804
[58] Field of Search ............... 426/603, 604, 575, 576, 426/804

[56] References Cited

U.S. PATENT DOCUMENTS

| | | | |
|---|---|---|---|
| 1,917,273 | 7/1933 | Reynolds . | |
| 4,273,790 | 6/1981 | Bosco | 426/603 |
| 4,273,795 | 6/1981 | Bosco | 426/603 |
| 4,279,941 | 7/1981 | Bosco | 426/603 |
| 4,292,333 | 9/1981 | Bosco | 426/603 |
| 4,446,165 | 5/1984 | Roberts | 426/602 |
| 4,533,561 | 8/1985 | Ward | 426/604 |
| 4,869,919 | 9/1989 | Lowery | 426/804 |
| 4,990,355 | 2/1991 | Gupta | 426/804 |
| 5,075,125 | 12/1991 | Mongeau | 426/603 |
| 5,093,144 | 3/1992 | Ebskamp | 426/576 |
| 5,126,161 | 6/1992 | Poppe | 426/576 |

FOREIGN PATENT DOCUMENTS

| | | | |
|---|---|---|---|
| 0237120 | 9/1987 | European Pat. Off. | 426/603 |
| 9216111 | 10/1992 | PCT Int'l Appl. | 426/603 |

OTHER PUBLICATIONS

Bailey's Industrial Oil and Fat Products, vol. 3, 1985, p. 75.
Gottenbos, J. J., chapter 8 in Beare-Rogers, J., ed., Dietary Fat Requirements in Health and Development, A.O.C.S., 1988, p. 109.
Mead, J., et al. Lipids, Plenum, N. Y. 1986, p. 459.

*Primary Examiner*—Carolyn Paden

[57] ABSTRACT

An improved low-fat, spatter-resistant, stick-type emulsified spread has a fat content of less than 50%. It is prepared by a process comprising: preparing a liquid fat phase comprising fat and an emulsifier effective for forming a water-in-oil emulsion; preparing an aqueous phase comprising water, flavor, and a gelling agent; agitating the aqueous phase and the fat phase together under conditions effective to form a water-in-oil emulsion; cooling and agitating the emulsion under conditions effective to crystallize fat and at least partially gel the aqueous phase; and then admixing lecithin with said emulsion. In a preferred form of the invention, the spread is prepared with a fat content of from 35 to 45%, and will contain at least 30% polyunsaturated fatty acids. Also preferred is the recycle of up to 25% of the emulsion to a point following partial fat crystallization.

13 Claims, 1 Drawing Sheet

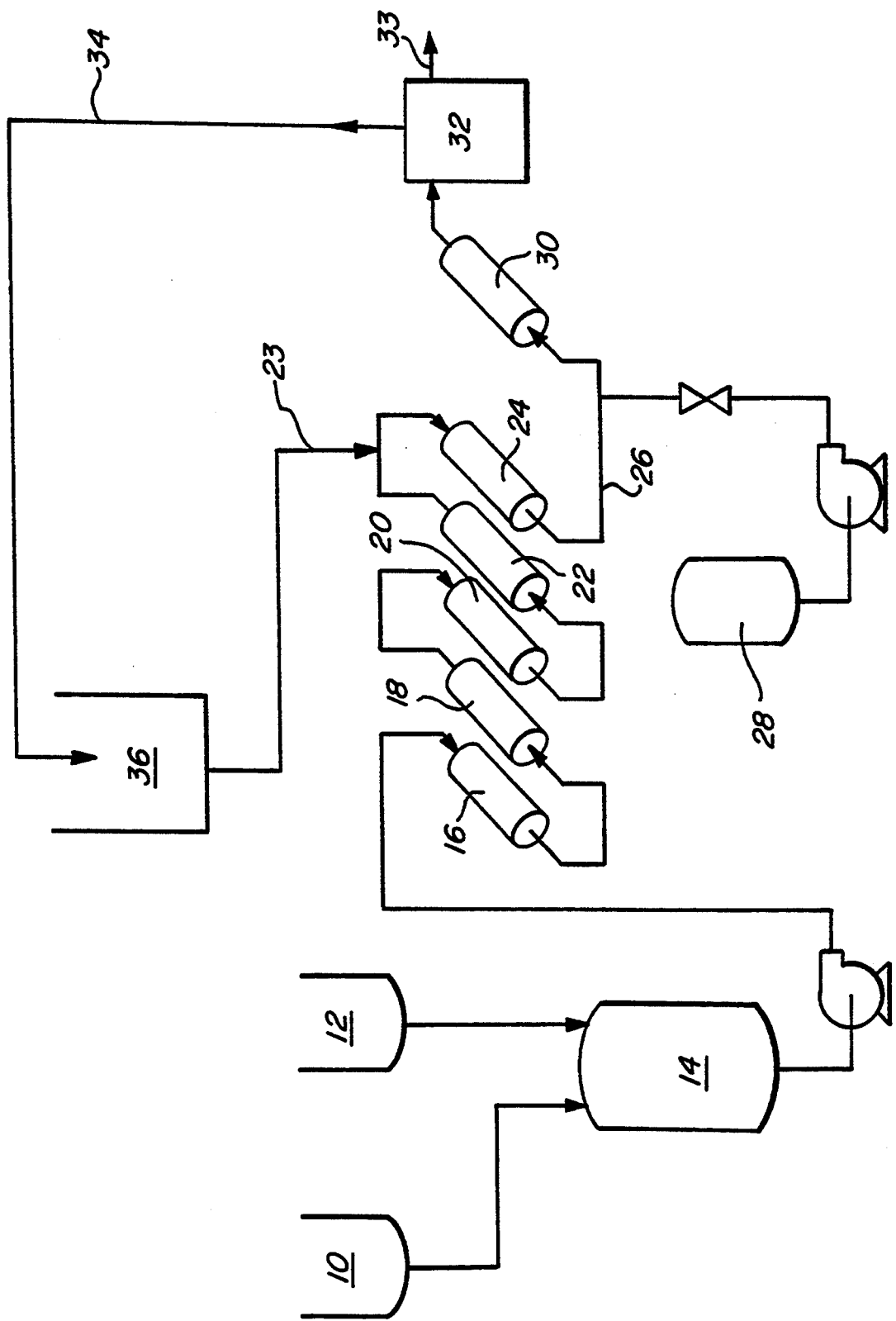

PROCESS FOR THE PREPARATION OF A SPATTER-RESISTANT LOW-FAT SPREAD

TECHNICAL FIELD

The invention relates to a low-fat spread, particularly one which is available in stick form and can be used in place of margarine, butter, or the like, and which has a reduced tendency to spatter if used to fry foods. In addition, the invention relates to an improved process for preparing a spread of this type.

Margarine, butter, and other "full-fat" spreads typically contain 80% fat by weight. Dietary fat is the most concentrated source of energy of all the nutrients, supplying 9 kcal/gram, about double that contributed by either carbohydrate or protein. The amount of fat in the American diet has increased in the last 60 years by about 25% (Mead, J., et al. Lipids, Plenum, New York, 1986, page 459), so that fats now provide approximately 40% (or more) of the daily caloric intake.

Because fats are high in calories and because some fats have been associated with health risks when consumed in large quantities over time, a number of national advisory committees on nutrition have recommended that the total amount of fat in the diet be reduced significantly (Gottenbos, J. J., chapter 8 in Beare-Rogers, J., ed., *Dietary Fat Requirements in Health and Development,* A.O.C.S. 1988, page 109).

Fat is not, however, without benefits unique to itself, and desirable low-fat spreads retain these. Fat contributes—sometimes greatly—to the palatability and flavor of food, since most food flavors are fat-soluble, and to the satiety value, since fatty foods remain in the stomach for longer periods of time than do foods containing protein and carbohydrate. Furthermore, fat is a carrier of the fat-soluble vitamins, A, D, E, and K, and the essential fatty acids, which have been shown to be important in growth and in the maintenance of many body functions. An objective of producers of margarine and other spreads is to make them both good tasting and compatible with the reasonable nutritional goals of most consumers.

The preparation of low-fat spreads has provided a wide range of new products for consumers eager to control their intake of both fat and calories. Low-fat products based on natural fats have been based on emulsions with increased levels of aqueous liquids. However, the use of water in amounts of up to about 80% of the weight of the spreads has necessitated the use of gelling agents such as gelatin or starch to control the release of water during storage and use. Because of the high water contents and the presence of the gelling agents, these spreads are not usually suggested for use in cooking as direct replacements for margarine or butter. However, they have often been used in this manner despite label instructions to the contrary.

When used for frying, a great deal of water is rapidly boiled off in close association with the oil. This results in spattering—typically, unpleasant and often dangerous. Attempts made to control the spattering by the addition of lecithin during processing, as done for soft margarines and full-fat spreads, has been problematic because it tends to adversely affect the quality of the emulsion.

BACKGROUND ART

The art of preparing low-fat margarine substitutes and other spreads has provided a wide range of products having consistencies ranging from liquid to solid. The present invention deals with spatter control in low-fat spreads which have sufficient solids to be formed into sticks, yet which have high levels of polyunsaturated fats in their preferred forms.

In U.S. Pat. No. 1,917,273, Reynolds disclosed that lecithin could be preblended with fat or added to mixtures of fat and aqueous phase during blending/emulsification in the preparation of margarine. Lecithin continues to be used at levels of 0.1 to 0.5% in most margarines due to its anti-spatter properties. It is typically added in its crude form, but there are other forms available. (Bailey's Industrial Oil and Fat Products, Vol. 3, 1985, p. 75).

In U.S. Pat. No. 4,446,165, Roberts discloses an emulsified food having up to 75% of an aqueous phase dispersed in a fat phase. The food, suitable as a margarine substitute, contains a water-in-oil destabilizing surfactant (such as lecithin dispersed in oil and encapsulated) which can rapidly destabilize the emulsion on contact with saliva or other aqueous liquid. The purpose for adding this agent in addition to lecithin added directly to the oil phase, is to permit the use of elevated levels of high-melting fats which prevent the margarine from slumping at room temperatures while avoiding the normal waxy mouthfeel which accompanies them. The destabilization of the water-in-oil emulsion containing these excessive solids, is said to provide a pseudo-melting character for these solid fats.

There is now on the market at least one 40% fat soft tub margarine substitute which has lecithin added to control spatter. The lecithin is added to this product as part of the oil phase prior to emulsification, as is typical for most margarine products. Attempts to add lecithin in this manner for a 40% fat stick margarine production, however, have not been successful.

It would be desirable to have a process which would enable the preparation of a stick-form margarine-type spread which, while low in fat, would not cause undue spatter when used to fry foods or otherwise subjected to high heat which would normally cause spatter.

DISCLOSURE OF INVENTION

It is an object of the invention to provide an improved low-fat, stick-type, butter-flavored spread which does not cause undue spatter when used to fry foods or otherwise subjected to high heat which would normally cause spatter.

It is another object of the invention to provide an improved process for preparing a stick-type spread which, while low in fat, does not cause undue spatter when it is used to fry foods or is otherwise subjected to high heat which would normally cause spatter.

It is yet another object of the invention to provide an improved spatter-resistant stick-type emulsified spread having a fat content of less than 50%, e.g., 40%.

It is a further object of a preferred form of the invention to provide an improved stick-type, low-fat, spatter-resistant, emulsified butter-flavored spread having a fat content of less than 50%.

It is another object of the invention to provide an improved process for preparing a spatter-resistant, stick-type emulsified spread having a fat content of less than 50%.

These and other objectives are accomplished by the present invention which provides a spatter-resistant, stick-type emulsified spread having a fat content of less than 50% and a process for preparing it.

The process comprises: preparing a liquid fat phase comprising fat and an emulsifier effective for forming a water-in-oil emulsion; preparing an aqueous phase comprising water, flavor, and a gelling agent; agitating the aqueous phase and the fat phase together under conditions effective to form a water-in-oil emulsion; cooling and agitating the emulsion under conditions effective to crystallize fat and at least partially gel the aqueous phase; and then admixing lecithin with the emulsion.

The spatter-resistant, stick-type emulsified spread having a fat content of less than 50%, comprises: a continuous fat phase comprising fat, lecithin, and an emulsifier effective for forming a water-in-oil emulsion; a dispersed aqueous phase comprising water, flavor, and a gelling agent in an amount effective to stabilize the emulsion, dispersed throughout the fat phase, wherein the fat phase comprises fat crystals, some of which are substantially free of lecithin and an uncrystallized portion of fat which contains the lecithin in an amount effective to reduce spatter. The preferred spreads will have fat contents within the range of from 30 to 45% and the gelling agent will comprise gelatin.

BRIEF DESCRIPTION OF THE DRAWINGS

The invention will be better understood and its advantages will be more fully appreciated from the following detailed description, especially when read in light of the accompanying drawings wherein:

The Figure is a schematic representation of a preferred process scheme.

DETAILED DESCRIPTION

The description which follows will center on the processing of a preferred product, using the preferred processing scheme. It will be understood, however, that other formulations and equipment can be employed.

The preferred products are butter flavored. The term "butter-flavored" is meant to include compositions flavored to simulate butter by both naturally-derived and simulated butter flavors. This term is used in its literal sense and is not meant to be otherwise restricted. A composition is considered "butter-flavored" when an expert panel trained to evaluate flavors of this type characterizes the product as "buttery" or "butter-like" in flavor.

Reference is now made to the Figure to aid in describing a preferred process scheme according to the invention. The drawing shows the separate preparation of fat and aqueous phases in vessel 10 and 12, respectively, feeding these separate phases to an emulsion tank which is shown here as vessel 14 where the mixture is emulsified, cooling the emulsion and crystallizing the fat in blender 16 and scraped-surface heat exchangers 18, 20, 22, and 24, and finally admixing lecithin from vessel 28 with the cooled emulsion in stick blender 30 just prior to forming the final product sticks at station 32.

The fat phase will comprise at least a suitable fat and an emulsifier effective for forming a water-in-oil emulsion. It can also contain fat-soluble vitamins, flavors, and coloring. The fat will distinguish a stick product from a soft (tub) product. To achieve the desired product consistency at fat contents of less than 50%, e.g., at least 15% and preferably from 30 to 45%, the fats will typically have solid fat indexes (SFI) within the following ranges:

| | |
|---|---|
| 50° F. | 10.0–30.0 |
| 70° F. | 7.0–20.0 |
| 92° F. | 0.5–5.0 | more preferred minimum solids at 50° F. and 70° F. are 15.0 and 10.0%, respectively. The preferred SFI values are within the following ranges:

| | |
|---|---|
| 50° F. | 18.5–23.0 |
| 70° F. | 11.5–15.0 |
| 92° F. | 0.5–3.3. |

The SFI's are determined by dilatometry, AOCS (86) (Cd 10–57).

The term "fat" as used herein is intended to include all edible, fatty acid triglycerides regardless of origin or whether they are solid or liquid at room temperature. Thus, the term "fat" includes normally liquid and normally solid vegetable oils and animal fats. Typical of the vegetable oils which are included are the usual vegetable oils such as soybean oil, corn oil, coconut oil, cottonseed oil, peanut oil, safflower oil, palm kernel oil, sunflower oil, palm oil, and rapeseed oil. The preferred fats for use in the invention will comprise a blend of liquid oil and one or more partially-hydrogenated vegetable oils. Most preferably, the oil will be selected from the group consisting of soybean oil, corn oil, coconut oil, cottonseed oil, peanut oil, palm oil, palm kernel oil, safflower oil, sunflower oil, rapeseed oil, and mixtures of these.

Preferred among these are blends of liquid and partially-hydrogenated corn oils. In this exemplary case, blend ratios of from 3:2 to 2:3 are preferred, e.g., 50% liquid corn oil and 50% corn oil which has been hydrogenated to a degree that the above SFI values are met for the blend. The oils will preferably have high levels of polyunsaturated fatty acids, preferably greater than 30%, e.g., 32 to 40%.

The fat will be selected to provide a solid product at 70° F., but will substantially completely melt in the mouth. Where necessary to increase the solids content at 40° or 70° F., an amount of a fat having a higher solids content can be added. Fats like hard stock stearin and cottonseed or soybean flakes have this ability, however, they remain solid and impart a waxy mouthfeel at eating temperature. Thus, while they can be employed to provide a desirable effect on texture, they should not be employed in large amounts, e.g., no more than 2%.

The emulsifier will be one which is effective for forming a water-in-oil emulsion, preferably a tight emulsion of this type, by simple agitation of the aqueous and fat phase ingredients such as in vessel 14 in the Figure. In practice, the fat phase is mixed in a separate mixing tank (not shown) by preparing a concentrate using only half of the oil for a given batch, transferring that to vessel 10 and then flushing the tank with the other half of the oil prior to adding to vessel 10. The fat phase can then be held in vessel 10 at a suitable temperature, e.g., from 110° to 125° F. for feeding into the emulsion tank 14.

Among the preferred emulsifiers are those with low HLB values (hydrophile-lipophile balance), typically less than 7. The emulsifier will preferably comprise a member selected from the group consisting of mixed fatty acid monoglycerides; mixed fatty acid diglycerides; mixtures of fatty acid mono- and diglycerides;

lipophilic polyglycerol esters; glycerol esters, such as glyceryl monooleate, glyceryl dioleate, glyceryl monostearate, glyceryl distearate, glyceryl monopalmitate, and glyceryl dipalmitate; lactylated esters such as glyceryl-lacto esters of fatty acids; propylene glycol esters such as propylene glycol monopalmitate, propylene glycol monostearate, and propylene glycol monooleate; sorbitan esters such as sorbitan monostearate, sorbitan trioleate, sorbitan tripalmitate, sorbitan tristearate, and sorbitan sesquioleate; fatty acids or their soaps such as stearic acid, palmitic acid, and oleic acid; and mixtures thereof.

There is no known criticality in the use of any particular lipophilic emulsifier. Thus, it is fully intended that other equivalent materials can be employed with satisfactory results. However, those specifically identified above, especially those selected from the group consisting of monoglycerides, lipophilic polyglycerol esters, mono- and diglycerides, propylene glycol esters, lactylated esters, and mixtures of these, are preferred from the standpoint of taste and effectiveness. The emulsifiers will be employed in amounts effective, and these will vary from formulation to formulation, however, it will typically amount to about 0.1 to 4.0%, e.g., from 1.0 to 1.5% by weight of the fat.

The products of the invention will most closely simulate butter and margarine when they are suitably colored and flavored with those materials known to the art for these purposes. Examples of coloring agents are beta carotene, annatto, turmeric, paprika and FD&C dyes. Typically, the colors will be dissolved or dispersed in oil or the water phase to expedite blending. Representative of the flavors and/or flavor enhancers will be sodium chloride; lactones; lipolyzed butter oils and starter distillates; diacetyl; 2-octanone, and other ketones; butyric acid, hexanoic acid, and other free fatty acids; esters of butyric acid, delta-hydroxy acids and their glycerol esters; and mixtures of any of these with other known dairy, buttery, or like flavors or flavor notes. It is an advantage of the invention that flavors have a good impact.

The aqueous phase will contain at least water and a gelling agent and can be prepared in vessel 12 or prepared before hand and transferred to that vessel awaiting feeding to emulsion tank 14. In practice, the dry ingredients, except for heat-sensitive flavors, are mixed at a suitable temperature for hydrating them, especially gelatin where used, e.g., 140° to 170° F., and then further heated, e.g., to 175° F. or more, to pasteurize the liquid phase. Heat-sensitive flavors can then be added. Heating for five minutes at 160° F. is typically effective for hydration and at 175° F. for five minutes for pasteurization.

The water can be added as tap water, purified tap water, milk, reconstituted dry milk, butter milk, and the like. The gelling agent can be any suitable food ingredient effective for this purpose and will preferably be hydrophilic colloids, and can be selected from the group consisting of gelatin, microcrystalline cellulose, carageenin, guar gum, alginate, xanthan gum, methyl cellulose, carboxymethyl cellulose, ethyl cellulose, hydroxypropylmethyl cellulose, dextrins, starch, locust bean gum, soy protein isolate, pectin and the like, and mixtures of these. The gelling agent will preferably be gelatin, e.g., one having a gel strength of greater than 200, preferably from 250 to 265, as measured by Bloom Gelometer. (the Official Procedure of the Gelatin Manufacturers Institute of America, Inc. 1986). The gelling agent will be employed in amounts effective, the amount varying with the agent employed, but will typically be employed at a level of from 1 to 5%, e.g., from 2 to 4%, of the weight of the aqueous phase.

In addition to emulsion stability, the products of the invention are preferably stable against micro-biological and oxidative deterioration. To control mold and yeast growth, the products desirably contain one or more preservatives such as benzoic acid, sorbic acid, phosphoric acid, lactic acid, and the soluble salts of these and other like materials. Preferred as anti-microbials are potassium sorbate, sodium sorbate, potassium benzoate, sodium benzoate and phosphoric acid. The pH of the aqueous phase is desirably maintained at a value below 6.0, and preferably within the range of 4.5 to 5.5 to provide effective microbial control and good flavor with the lowest necessary levels of preservatives. Additional stability against oxidative deterioration at higher temperatures may be obtained by the use of the usual anti-oxidants, typical among which are normal propyl gallate, the several tocopherols, butylated hydroxyanisole (BHA), butylated hydroxytoluene (BHT), nordihydroguaiaretic acid (NDGA), tertiary-butylhydroquinon (TBHQ), and citric acid.

The aqueous phase is held in vessel 12 at a temperature effective to maintain its liquid state and compatible with emulsification in vessel 14. Typically, the oil will be maintained at a temperature of from 110° to 125° F. in vessel 10, and the aqueous phase will be maintained at a temperature of from 120° to 140° F.

The aqueous and fat phases are fed to vessel 14 and agitated under conditions effective to form a tight emulsion. To achieve this, the temperature will typically be maintained at greater than 100° F., e.g., from 120° to 130° F. The agitation can be completed in emulsion vessel 14 by a suitable agitator or can be further enhanced by in-line mixing or a homogenization unit.

From the vessel 14, the emulsion is pumped to a series of blenders and coolers which maintain emulsion integrity while the total emulsion is cooled effectively to set the gelling agent in the aqueous phase and crystallize at least a portion of the fat in the fat phase. The crystallization of the fat effects solidification of the fat phase by creating a two-phase fat mixture comprising liquid oil and crystals of solid fat. When the crystals grow sufficiently, e.g., to comprise at least about 10% and preferably 15 to 25% of the fat, they enable the total fat phase, including the solid and liquid portions to retain a self-sustaining shape at the temperatures involved.

To achieve this degree of cooling and solidification while maintaining a stable emulsion, the emulsion is first passed through a scraped-surface heat exchanger 16, such as a Votator A unit which reduces the temperature of the emulsion by about 20° to about 60° F., typically from about 125° down to about 70° F. at the exit of this unit. From there, the emulsion is further worked and cooled, preferably first worked in shortening blender 18, e.g., "working B" unit. Typically, this unit will have pins arranged in a helical pattern on a shaft, the pins arranged to intermesh with pins extending inwardly from an enclosing outer cylindrical wall. The work done on the emulsion facilitates crystallization, and this crystallization plus the work input will cause a moderate temperature increase of say from an entrance temperature of from about 68° to 80° F. to an exit temperature of from about 80° to 85° F. During a residence time of from about 2 to 6 minutes in unit 18, e.g., 4 to 5 minutes, the gelatin or other thickener gels and the aqueous phase is broken into small droplets with crystallizing fat coating the droplets. Further cooling is then achieved by passing the emulsion from blender 18 through one or more additional scraped-surface heat exchangers, shown in the Figure as 20, 22, and 24. If desired, from about 5 to about 25%, e.g. up to about 10%, of recycled emulsion can be introduced between the first and the last heat exchangers, e.g., between units 22 and 24, through line 23. At this point, significant fat crystallization has occurred and has developed an amount of fat crystals which is sufficient to stabilize the emulsion in solid form. No emulsion is recycled into the emulsion tank 14. Cooling to about 40° to 45° F. at the exit from the last unit is preferred.

From the last scraped-surface heat exchanger 24, the emulsion is passed via line 26 to stick blender 30, which can be a smaller version of the shortening blender 16. Just prior to passage into the stick blender, lecithin is injected into the emulsion in line 26 from vessel 28. A residence time of from 5 to 20 seconds at a higher rpm than in the shortening blender is generally effective to fully disperse the lecithin in the cooled emulsion. The lecithin is preferably crude lecithin characterized as fluid unbleached lecithin, but can be in any effective form. The lecithin is typically added in an amount of from 0.1 to 0.5%, e.g., from 0.25 to 0.35% of the product.

From the stick blender 30, the mixture of emulsion and lecithin is passed to stick former 32, e.g., a molded print unit, wherein the standard one quarter pound stick shape or other desired portion is formed and wrapped with a suitable material. Finished product exits the process at 33. It is an advantage of the invention that no hold tubes are required prior to the filler. The filler head is preferably enlarged from conventional to say 4.0 liters, and the filler is desirably overfed to assure maintenance of package weights. All overfed material is fed from stick former 32 via line 34 to recycle tank 36. No lecithin or lecithin-containing material should be fed to the emulsion tank.

The product comprises a continuous, solid fat phase as defined above and a dispersed, gelled aqueous phase, wherein the fat phase comprises fat crystals substantially free of lecithin and an uncrystallized portion of fat which contains the lecithin. The use of lecithin at the levels necessary to form an emulsion which remains stable during processing with fats used at the low levels employed herein and with sufficient solids to form stick margarines, necessarily depends on gelling the aqueous phase and solidifying a portion of the fat prior to adding the lecithin. Following tempering for two days at 40° F., the penetrometer readings will be in the range of from 115 to 145, preferably from 125 to 135.

The following Example is provided to further illustrate and explain a preferred form of the invention and is not to be taken as limiting in any regard. Unless otherwise indicated, all parts and percentages are by weight.

EXAMPLE

This example illustrates the preparation of a 40% fat stick spread having a flavor and texture approximating butter and margarine, using a process arrangement as shown in the Figure and employing the following formulation:

| Ingredient | Parts |
|---|---|
| Fat Phase | |
| Liquid corn oil* | 21.71 |
| Partially Hydrogenated Corn Oil | 17.76 |
| Dimoden O Distilled Monoglycerides | 0.50 |
| Flavor | 0.025 |
| Vitamins | 0.01 |
| Aqueous Phase | |
| Water | 54.70 |
| Gelatin (275 bloom) | 3.00 |
| Salt | 1.00 |
| Whey | 1.00 |
| Potassium Sorbate | 0.13 |
| Sodium Benzoate | 0.10 |
| Citric Acid | 0.10 |
| EDTA | 0.006 |
| Milk Flavor | 0.005 |
| Defoamer | 0.003 |
| Lecithin | |
| Crude Lecithin | 0.20 |

*The blend of the liquid and partially hydrogenated corn oil had a polyunsaturated fatty acid content of about 36% and the following SFI values:
50° F.   21.5
70° F.   13.8
92° F.   3.3

To prepare the emulsion, one half of the oil and all of the other oil phase ingredients are heated to 125° F., and stirred until clear, e.g., for 10 minutes. The resulting oil phase concentrate is then fed to vessel 10 and the remainder of the oil is used to flush the mixer. Once combined in the holding tank 10, the complete oil phase is mixed by recirculating for 45 minutes to 1 hour. It is stored for use in the holding tank 10 at 110° to 125° F.

The aqueous phase is prepared by adding all of the solids except for the milk flavor to water heated to 160° F. with agitation. The mixture is agitated for at least about 5 minutes to achieve full hydration of the ingredients, especially the gelatin. Once hydration is complete, the mixture is heated to 175° F. for 5 minutes to pasteurize it. Following pasteurization, the aqueous phase is fed to a holding vessel, such as 12 in the Figure, and held at 125° to 135° F. until it is fed into the vessel 14 for emulsification.

The prepared oil and aqueous phases are fed into the emulsification vessel 14 in the appropriate proportions as indicated. This will provide a fat content of about 40% by weight. Emulsification is achieved in the vessel by continuous agitation, e.g., with a lightnin mixer, run at 500 rpm, to fully emulsify a batch size of 1500 pounds.

Following emulsification, the emulsion is fed to a first Votator scraped-surface heat exchanger 16 where it is cooled from about 125° to about 75° F. From there, the cooled emulsion is fed to a 11×51 Votator shortening blender operated at 300 rpm where it is processed for about 4.5 minutes. The emulsion is discharged at a temperature of from 80° to 85° F. The emulsion is then fed through a succession of three additional Votator scraped-surface heat exchangers 20, 22, and 24 to further cool and work the emulsion to a final temperature of from 40° to 44° F. About 10% by weight of recycled emulsion is introduced via line 23 between units 22 and 24.

The cooled emulsion is fed to a Benhil stick blender 30 run at about 650 rpm via line 26. Just prior to entering the blender, a stream of lecithin at 95° to 105° F. is injected into the cooled emulsion. The lecithin is dispersed in the products by blender 30 prior to printing into ¼ pound sticks by stick former 32.

When the process was run by adding lecithin directly to the emulsion tank, the emulsion broke readily.

The above description is for the purpose of teaching the person of ordinary skill in the art how to practice the present invention, and it is not intended to detail all of those obvious modifications and variations of it which will become apparent to the skilled worker upon reading the description. It is intended, however, that all such obvious modifications and variations be included within the scope of the present invention which is defined by the following claims. The claims are meant to cover the claimed elements and steps in any arrangement or sequence which is effective to meet the objectives there intended, unless the context specifically indicates the contrary.

We claim:

1. A process for preparing a spatter-resistant, stick-type emulsified spread having a fat content of less than 50%, comprising:
    preparing a liquid fat phase comprising fat and an emulsifier effective for forming a water-in-oil emulsion;
    preparing an aqueous phase comprising water, flavor, and a gelling agent;
    agitating the aqueous phase and the fat phase together under conditions effective to form a water-in-oil emulsion;
    cooling and agitating the emulsion under conditions effective to crystallize fat and at least partially gel the aqueous phase; then
    admixing lecithin with the emulsion; and
    forming the resulting cooled emulsion containing lecithin to form a spatter-resistant, stick-type spread.

2. A process according to claim 1, wherein the fat content of the spread is within the range of from 30 to 45%.

3. A process according to claim 1, wherein the gelling agent comprises gelatin, carageenin, pectin, Agar-Agar or a xanthan-locust bean gum blend.

4. A process according to claim 1, which further comprises the step of forming the emulsion with the added lecithin into a stick shape.

5. A process according to claim 1, wherein the fat has a solid fat content profile as follows:

| 50° F. | 15.0–30.0 |
| 70° F. | 10.0–20.0 |
| 92° F. | 0.5–5.0. |

6. A process according to claim 5, wherein the fat has a solid fat content profile as follows:

| 50° F. | 19.5–23.0 |
| 70° F. | 12.5–15.0 |
| 92° F. | 1.5–3.3. |

7. A process according to claim 5, wherein the fat comprises at least 30% polyunsaturated fatty acids.

8. A process according to claim 5, wherein the spread exhibits a penetrometer reading of from about 115 to about 145 after tempering for 2 days at 40° F.

9. A process according to claim 1, wherein the spread exhibits a penetrometer value of from about 115 to about 145 after tempering the spread at 40° F. or 2 days.

10. A process according to claim 1, which further includes adding butter flavor to the oil phase prior to emulsification.

11. A process for preparing a spatter-resistant emulsified stick-form margarine substitute having a fat content of from 30 to 50%, comprising:
    preparing a liquid fat phase comprising fat and an emulsifier effective for forming a water-in-oil emulsion, the fat having a solid fat content profile as follows:

| 50° F. | 15.0–30.0 |
| 70° F. | 10.0–20.0 |
| 92° F. | 0.5–5.0; | preparing an aqueous phase comprising water, flavor, and gelatin, carageenin, pectin, Agar-Agar, or a xanthan-locust bean gum blend;
    agitating the aqueous phase and the fat phase together under conditions effective to form a water-in-oil emulsion;
    cooling and agitating the emulsion under conditions effective to crystallize fat and at least partially gel the aqueous phase; then
    admixing lecithin with the emulsion; and
    forming the resulting cooled emulsion with the added lecithin into a stick shape to form a spatter-resistant, stick-type spread.

12. A process according to claim 11, wherein the fat has a solid fat content profile as follows:

| 50° F. | 19.5–23.0 |
| 70° F. | 12.5–15.0 |
| 92° F. | 1.5–3.3. |

13. A process according to claim 11, wherein the fat comprises at least 30% polyunsaturated fatty acids.

* * * * *